(12) United States Patent
Barth et al.

(10) Patent No.: US 9,221,690 B2
(45) Date of Patent: Dec. 29, 2015

(54) PROCESS FOR PRODUCING A SILICA SOL MATERIAL

(75) Inventors: Ekkehard Barth, Köln (DE); Rolf Bachmann, Bergisch Gladbach (DE); Arne Braun, Leverkusen (DE); Maren Heinemann, Bergisch Gladbach (DE); Sebastian Schmidt, Lubbock, TX (US)

(73) Assignee: JIANGSU SYNECOUN MEDICAL TECHNOLOGY CO., LTD, Taizhou, Jiangsu Province (CN)

( * ) Notice: Subject to any disclaimer, the term of this patent is extended or adjusted under 35 U.S.C. 154(b) by 410 days.

(21) Appl. No.: 13/702,676

(22) PCT Filed: Jun. 6, 2011

(86) PCT No.: PCT/EP2011/059302
§ 371 (c)(1),
(2), (4) Date: Mar. 3, 2013

(87) PCT Pub. No.: WO2011/154361
PCT Pub. Date: Dec. 15, 2011

(65) Prior Publication Data
US 2013/0145964 A1    Jun. 13, 2013

(30) Foreign Application Priority Data
Jun. 10, 2010    (DE) .......................... 10 2010 023 336

(51) Int. Cl.
| | | |
|---|---|---|
| *C01B 35/14* | (2006.01) | |
| *C01B 33/141* | (2006.01) | |
| *C01B 33/145* | (2006.01) | |
| *C01B 33/148* | (2006.01) | |
| *C04B 35/622* | (2006.01) | |
| *C04B 35/624* | (2006.01) | |
| *C04B 35/626* | (2006.01) | |
| *C08L 83/02* | (2006.01) | |
| *C01B 33/14* | (2006.01) | |

(52) U.S. Cl.
CPC ............... *C01B 33/141* (2013.01); *C01B 33/14* (2013.01); *C01B 33/145* (2013.01); *C01B 33/148* (2013.01); *C04B 35/624* (2013.01); *C04B 35/6224* (2013.01); *C04B 35/6263* (2013.01); *C04B 35/62635* (2013.01); *C04B 35/62685* (2013.01); *C08L 83/02* (2013.01); *C04B 2235/3418* (2013.01); *C04B 2235/441* (2013.01)

(58) Field of Classification Search
CPC .... C01B 33/14; C01B 33/141; C01B 33/145; C01B 33/148
See application file for complete search history.

(56) References Cited

U.S. PATENT DOCUMENTS

| | | | |
|---|---|---|---|
| 8,088,965 B2 * | 1/2012 | Thierauf et al. | 602/44 |
| 8,206,675 B2 * | 6/2012 | Thierauf | 423/325 |
| 2010/0174045 A1* | 7/2010 | Thierauf | 528/296 |
| 2011/0009023 A1* | 1/2011 | Glaubitt et al. | 442/327 |
| 2011/0183419 A1* | 7/2011 | Glaubitt | 435/398 |

FOREIGN PATENT DOCUMENTS

| | | |
|---|---|---|
| DE | 19609551 C1 | 7/1997 |
| DE | 102004063599 A1 | 7/2006 |
| WO | 2008086970 A1 | 7/2008 |
| WO | 2008148384 A1 | 12/2008 |
| WO | 2009077104 A1 | 6/2009 |

OTHER PUBLICATIONS

International Search Report of PCT/EP2011/059302 mail dated Jan. 30, 2012.

* cited by examiner

*Primary Examiner* — David M Brunsman
(74) *Attorney, Agent, or Firm* — Miles & Stockbridge P.C

(57) ABSTRACT

The present invention relates to an improved process for producing a biodegradable and/or absorbable silica sol material which is advantageous especially with regard to the reproducibility of the material, the rapidity of the synthesis and the possibility of being able to produce the silica sol material on an industrial scale. A further subject matter of the invention relates to a biodegradable and/or absorbable silica sol material which can be produced by the synthesis process according to the invention.

7 Claims, 1 Drawing Sheet

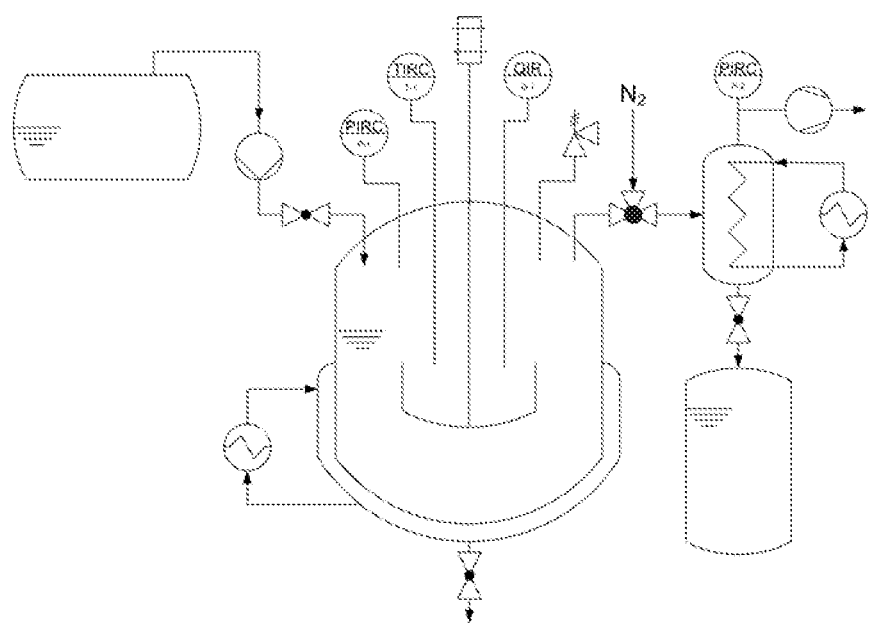

PROCESS FOR PRODUCING A SILICA SOL MATERIAL

CROSS REFERENCE TO RELATED APPLICATIONS

This application is a §371 National Stage Application of PCT/EP2011/059302, filed Jun. 6, 2011, which claims priority to German Application No. 102010023336.6, filed Jun. 10, 2010.

BACKGROUND OF THE INVENTION

1. Field of the Invention

The present invention relates to a process for producing a biodegradable and/or absorbable silica sol material which is advantageous especially with regard to the reproducibility of the material, the speed of the synthesis and the possibility of being able to produce the silica sol material on an industrial scale. A further subject matter of the invention relates to a biodegradable and/or absorbable silica sol material which can be produced by the synthesis process according to the invention.

2. Description of Related Art

Biodegradable and/or absorbable silica sol materials and the production thereof are described in the prior art.

DE 196 09 551 C1 describes biodegradable/bioabsorbable fibre structures which can be obtained in a sol gel process by drawing threads from a spinning mass and optionally drying them. The production of the sol material involves a hydrolysis-condensation step in which the starting materials tetraethoxysilane (TEOS), ethanol, water and nitric acid are mixed in the molar ratio 1:1.26:x:0.01 (where x=1.6, 1.7, 1.8, 1.9 or 2.0). DE 196 09 551 C1 describes how the required water/acid mixture is added directly to the silicon compound to be hydrolysed (TEOS) at room temperature or with slight cooling and the resulting mixture is then stirred for one to several hours. When the hydrolysis is complete, solvent is removed from the resulting mixture until the mixture has a viscosity between 0.05 and 50 Pa·s at room temperature and a shear gradient of 20 $s^{-1}$. Preferably, filtration is then carried out. The filtrate is ripened in a closed vessel at a temperature of 3° C. and a ripening time of from 6 hours to 6 months to give the silica sol material. The silica sol material can then be spun to give a fibre.

The addition of an aqueous acid to the Si compound located in a solvent can result in the formation of mist in the reaction vessel. The particles which are found in such a mist can subsequently be removed only by means of a filtration step. If the particles are not removed via a filtration step, they may, for example during the further processing of the silica sol material to give a silica gel fibre by means of a spinning apparatus, block the spinning jets of the spinning apparatus. The spinning process then has to be interrupted and the jets have to be cleaned. On the other hand, an additional filtration step is to be avoided as far as possible since synthesis material is lost with the filtration which can no longer be reacted to give the silica sol material.

WO2008/086970A1 relates to a similar silica sol material for which, however, the hydrolysis-condensation step is carried out over a period of at least 16 hours. The hydrolysis-condensation reaction is preferably carried out discontinuously in a stirred container. The Si compound and the solvent are preferably introduced as initial charge. An acid, preferably in the form of $HNO_3$, is then added swiftly. It is described how the hydrolysis-condensation reaction proceeds rapidly on account of the acid strength and the contents of the container heat up by about 40° C. Subsequent removal of the solvent is carried out until the viscosity of the mixture is from 0.5 to 2 Pa·s at a shear rate of 10 $s^{-1}$ at 4° C. A filtration is allegedly not required. The ripening follows at a temperature of preferably 2° C. to 4° C. in order to bring about a further condensation under kinetically controlled conditions, the aim being to suppress the formation of a three-dimensional polymeric gel network. The product of the ripening preferably has a viscosity of from 35 to 45 Pa·s (shear rate 10 $s^{-1}$ at 4° C.) with a loss factor (at 4° C., 10 $s^{-1}$, 1% deformation) of from 2.5 to 3.5.

WO2008/148384A1 relates to a similar silica sol material. When producing this material, a gas-diffusion-tight container, preferably a rotary evaporator, is used during the evaporation. The hydrolysis-condensation step involves the direct addition of a mixture of $H_2O$ and $HNO_3$ to a mixture of TEOS and ethanol. The kinetically controlled ripening is carried out in particular by means of vibration-free storage of the reaction mixture in a closed gas-diffusion-tight vessel.

WO2009/077104A relates to a similar silica sol material for which, in contrast to WO2008/148384A1, the evaporation takes place in a closed apparatus optionally by means of a continuous introduction of a chemically inert stream of entrainer gas.

All of the specified processes from the prior art involve at least three steps: hydrolysis-condensation, solvent removal and ripening. The steps are obviously carried out in different vessels. The times for the individual steps sometimes vary considerably. The individual steps are complete when a preferred viscosity has been established; i.e. it is obviously necessary to monitor the viscosity of the reaction mixtures in order to be able to end a step upon the presence of the desired (intermediate) product.

In the specified processes from the prior art, the hydrolysis-condensation reaction takes place with the rapid bringing together of the silicon compound to be hydrolysed and the acid. As described in each case, the exothermy of the reaction results in a considerable increase in temperature. Such a temperature increase is to be avoided especially in the case of an up-scaling to an industrial production on a large scale inter alia for safety reasons. Moreover, as a result of temperature inhomogeneities within the reaction mixture, product inhomogeneities can arise particularly on an industrial scale.

According to the prior art, the ripening preferably takes place vibration-free at a temperature of −20° C. to 10° C. and it can last from 6 hours to 6 months. Such a process is not scaleable and is therefore unsuitable for large-scale production.

On account of the inadequate controllability of the processes described in the prior art, the end of the silica sol material production process at the start of the production can only be predicted within a range of ±2 days. Particularly with regard to the biodegradable or bioresorbable properties of the materials, which possibly permit only short storage times, the uncertainties described above are not conducive to useful economic planning and production.

SUMMARY

The object of the present invention was therefore to address the disadvantages of the prior art and to provide an improved process for producing silica sol materials. The process should permit a reproducible production of silica sol materials. The process should be scaleable to an industrial scale and permit a more precise prediction of the end of the reaction. The changing of reaction vessels between the individual steps is to be avoided.

The object is achieved by a process for producing a silica sol material which involves the following steps:
(a) controlled bringing together of an aqueous acid solution and a hydrolysable silicon compound,
(b) subsequent evaporation to give a single-phase solution with a viscosity in the range from 0.5 to 30 Pa·s at a shear rate of 10 s$^{-1}$ at 4° C., and
(c) ripening of the single-phase solution obtained in step (b) to give a silica sol material with a viscosity between 30 and 100 Pa·s at a shear rate of 10 s$^{-1}$ at 4° C. and a loss factor of from 2 to 5.

BRIEF DESCRIPTION OF THE DRAWINGS

FIG. 1 represents an embodiment of the invention described herein.

DETAILED DESCRIPTION OF A PREFERRED EMBODIMENT

Instead of rapidly adding an aqueous acid to the hydrolysable silicon compound as described in the prior art (WO 2008/086970 p. 4 1. 24), in the present invention, these components are brought together in a controlled manner. A "controlled bringing together" is understood here as meaning that the bringing together does not take place rapidly, and not quickly, but over a preset extended period. The bringing together takes place such that the temperature of the mixture remains within a preset temperature range.

Preferably, the bringing together takes place over a period of at least 15 minutes, particularly preferably at least 30 minutes and even more preferably of at least 1 hour. The shorter the period selected for the metered addition, the more likely additional apparative measures will be required in order to be able to dissipate the amounts of heat that are formed during the reaction and keep the temperature of the reaction mixture within a preset range.

It is surprising that the bringing together of hydrolysable silicon compound and aqueous acid solution over a prolonged period extended compared to the prior art does not lead to a noticeably altered mass distribution of the polymers. If, for example, the synthesis process described in WO2008/086970A1 is modified according to the invention such that the addition of the aqueous acid solution to the hydrolysable silicon compound does not take place rapidly but over a period of 1 hour, this has no noticeable influence on the polymer distribution resulting at the end of the process (after the ripening), for example measured by means of gel permeation chromatography.

However, the controlled bringing together has considerable advantages especially with regard to a process operated on an industrial scale, for example as regards observing safety precautions, in terms of process control and with regard to the reproducibility.

It is conceivable to carry out the bringing together in step (a) of the process according to the invention at a constant rate. It is likewise conceivable to carry out the bringing together such that the temperature of the reaction mixture develops within a preset range. In the last-mentioned case, a control cycle is thus present in which the bringing together of the components is controlled by means of the temperature and/or temperature change in the reaction mixture.

In a preferred embodiment of the process according to the invention, the bringing together in step (a) takes place under quasi-isothermal conditions. The term "quasi-isothermal conditions" is understood as meaning that a chemical reaction is carried out at as constant a temperature as possible. In the case of the present process, in step (a), the reaction would appear to proceed under quasi-isothermal conditions preferably within a bottom-temperature range (i.e. measured within the reaction mixture) of ±5° C., preferably of ±2° C., particularly preferably of ±0.5° C.

In a further preferred embodiment of the process according to the invention, the bringing together of the components in step (a) takes place such that the heat released by the hydrolysis-condensation reaction is utilized for heating the synthesis mixture. It is therefore possible to avoid overheating the synthesis mixture, e.g. in the case of heat exchangers that are too inefficient and/or sluggish, and the hydrolysis-condensation reaction can be carried out in a more controlled manner at the desired temperature.

The hydrolysis-condensation reaction in step (a) is preferably carried out with stirring.

The term "hydrolysable silicon compound" preferably refers to an Si compound of formula (I)

$$SiX_4 \qquad (I)$$

in which the radicals X are identical or different and are hydroxy, hydrogen, halogen, amino, alkoxy, acyloxy, alkylcarbonyl and/or alkoxycarbonyl and are derived from alkyl radicals which are optionally substituted straight-chain, branched or cyclic radicals having 1 to 20 carbon atoms, preferably having 1 to 10 carbon atoms, and can be interrupted by oxygen or sulphur atoms or by amino groups. In one preferred embodiment according to the invention, X in formula (I) is an optionally substituted straight-chain, branched and/or cyclic alkoxy radical having 1 to 20 carbon atoms, preferably having 1 to 10 carbon atoms. Particularly preferably, X in formula (I) is an optionally substituted straight-chain and/or branched $C_1$-$C_5$ alkoxy radical. Substituted, but preferably unsubstituted straight-chain and/or branched $C_2$-$C_3$ alkoxy radicals, such as, for example, ethoxy, N-propoxy and/or isopropoxy, are further particularly preferred. According to the invention, very particular preference is given to using tetraethoxysilane (TEOS) as hydrolysable Si compound in the process according to the invention.

The term "aqueous acid solution" describes mixtures and/or solutions which have a pH of 0 to ≤7, preferably from 0 to 2. Besides water and a proton donor, the aqueous acid solution can comprise one or more further substances which serve for example as solubility promoters. Preferably, a water-soluble solvent is added. Particular preference is given to ethanol. The aqueous acid solution comprises preferably water and ethanol in the molar ratio from 1:1.27 to 1:1.59, particularly preferably in the molar ratio of 1:1.41.

The proton donor used is preferably nitric acid.

As well as a preferably ethanolic aqueous nitric acid solution, also of suitability according to the invention are aqueous or alcoholic (preferably an aqueous dilute ethanolic) solution of a physiologically compatible acid (e.g. citric acid, succinic acid, tartaric acid, acetic acid or ascorbic acid) and at least one essential amino acid (e.g. L-arginine, particularly preferably; L-valine, L-leucine, L-isoleucine, L-phenylalanine, L-thyroxine, L-methionine, L-lycine or L-tryptophan) or non-essential amino acid (e.g. L-glutamine, L-glutamic acid, L-asparagine, L-aspartic acid,
L-cysteine, L-glycine, L-alanine, L-proline, L-histidine, L-tyrosine). Such mixtures and/or solutions form, enzymatically, nitrogen monoxide (NO) in a physiological environment with molecular oxygen (by means of a nitroxide synthase, NOS). Moreover, it is also possible to use organic nitrates and/or nitrate esters (so-called NO donors) such as e.g. ethyl nitrate, which form NO with the help of an organic nitrate reductase. Thiol groups (cysteine) are required for this enzymatic release of NO.

For the hydrolysis of the silicon compound, a sufficiently large amount of water is used that the molar ratio of $SiX_4$:water is in the range from 1:1.5 to 1:2.5, preferably in the range from 1:1.7 to 1:1.9, particularly preferably in the range from 1:1.7 to 1:1.8.

The bringing together of the components in step (a) can take place in different ways. It is conceivable to initially introduce the hydrolysable silicon compound into the reactor and to add the aqueous acid solution. In this case, it is conceivable to initially introduce the hydrolysable silicon compound in a suitable solvent (for example ethanol in the case of TEOS).

A further preferred embodiment relates to a process for producing a silica sol material in which both the acid and also the hydrolysable silicon compound are metered into a solvent in parallel in a controlled manner. Preferably, the hydrolysable silicon compound is mixed beforehand with some of the solvent, preferably 35 to 38% of the solvent. Overall, the amount of solvent thus preferably does not change. However, at the start, there is proportionately less solvent in the reaction mixture to which the acid and the described mixture of some of the solvent and the hydrolysable silicon compound are metered in in a controlled manner. This embodiment is of importance especially with regard to a continuous production process (on an industrial scale). In this embodiment, the acid and the hydrolysable silicon compound can be metered in independently of one another (for example via different reaction vessel openings and pump systems) over different periods of time. Preferably, however, the same period of time for the metered addition is selected proportionally to the volume stream. The metered-in hydrolysable silicon compound amount and/or the added amount of acid is preferably constant per time unit. This embodiment of the invention is preferably carried out under quasi-isothermal conditions. Preferably, the hydrolysable silicon compound or the acid is metered in over a period of at least 15 minutes, preferably at least 30 minutes and even more preferably at least 1 hour.

A further subject matter of the present invention is directed to a process for producing a silica sol material in which a hydrolysable silicon compound is metered into an acid in a solvent. This controlled bringing together, also referred to below as "inverse metering", surprisingly leads to a new type of sol which is reproducible and can be produced in a controlled manner, but whose physical properties differ from those physical properties described in the prior art. The sol obtained by inverse metering can be spun to give a fibre and is also biologically degradable and/or absorbable. Compared to those described in the prior art, this sol has a lower viscosity for the same loss factor.

The loss factor is the quotient of viscous to elastic portion of the dynamic viscosity. Too low a loss factor means too high an elasticity of the material, which is e.g. not conducive to the formation of a stable thread upon spinning (gelling, tearing of the thread). If the loss factor is too high, the material is so free-flowing that stable thread formation is impossible (drop formation).

The loss factor is therefore an important parameter for determining the quality of the silica sol material with regard to its further use (for further details on this see below). If the viscosity is lower for the same loss factor like in the case of the silica sol material which results from inverse addition, then such a material is easier to process and is accordingly advantageous.

In the case of inverse metering, the hydrolysable silicon compound is preferably dissolved beforehand only in a small portion of a solvent, preferably 0 to 5%, if any. Overall, the amount of solvent therefore preferably does not change. However, at the start of the reaction, no or proportionately less solvent is present in the reaction vessel to which the silicon compound or the mixture of some of the solvent and the hydrolysable silicon compound are metered in in a controlled manner. The inverse metering is preferably also carried out under quasi-isothermal conditions. Preferably, the metered amount of hydrolysable silicon compound per time unit is constant or approximately constant. Preferably, the hydrolysable silicon compound is metered in over a period of at least 15 minutes, preferably at least 30 minutes and even more preferably at least 1 hour. Surprisingly, in the case of the inverse metering, compared to the other embodiments in the prior art and described hitherto, it has also been established that the reaction overall is faster. At a temperature of 37° C. and under otherwise identical conditions, the reaction lasts in total only 4 hours instead of 18 in the case of the other controlled metered addition methods. Also in the case of the inverse metering, the reaction is likewise faster at a higher temperature.

A further subject matter of the invention is directed to a silica sol material produced by a controlled metered addition of a hydrolysable silicon compound to an acid located in a solvent, subsequent evaporation to give a single-phase solution with a viscosity in the range from 0.5 to 1.5 Pa·s at a shear rate of $10\ s^{-1}$ at 4° C., and ripening of this single-phase solution to give a silica sol material with a viscosity of 30 Pa·s at a shear rate of $10\ s^{-1}$ at 4° C., a loss factor of 3.

After the bringing together of the components in step (a) and before the evaporation in step (b), the reaction mixture is preferably stirred for some time further until a dynamic equilibrium has been established.

The reaction time depends on the selected temperature and the period of controlled metered addition. For example, at a temperature of 55° C. and a controlled metered addition of the acid to the hydrolysable silicon compound located in the solvent over a period of one hour, the reaction lasts in total about 5 hours on a laboratory scale. At a temperature of 37° C. and under otherwise identical conditions, the reaction lasts 18 hours.

The hydrolysis condensation is preferably carried out without pressure (i.e. without superatmospheric pressure at about 101 325 Pa) preferably at a temperature of 0° C. to 78° C. Through appropriate pressure regulation, it is also possible to carry out the reaction at temperatures above the boiling point of ethanol (i.e. 78° C.).

The reactive evaporation in step (b) to give a single-phase solution is carried out, as described in the prior art, to a dynamic viscosity (η) of the mixture to 0.5 to 30 Pa·s at a shear rate of $10\ s^{-1}$ at 4° C., preferably 0.5 to 2 Pa·s at a shear rate of $10\ s^{-1}$ at 4° C., particularly preferably 1 Pa·s at a shear rate of $10\ s^{-1}$ at 4° C.

In one preferred embodiment of the invention, step (b) is carried out in a closed apparatus in which a thorough mixing is possible and during which at the same time the solvent (i.e. e.g. water, ethanol) can also be evaporated. Preferably, the bottom temperature is kept constant (i.e. ±5° C., preferably ±2° C.) by regulating the pressure (adjustment between preferably 500 and 120 mbar variable with time), meaning that solvent is removed continuously with gentle boiling from the mixture to the point of the aforementioned viscosity. The reaction temperature can be selected as described in the prior art, i.e. preferably between 30° C. and 78° C., and particularly preferably between 60° C. and 75° C. Preferably, step (b) is carried out with gentle thorough mixing of the reaction system.

The single-phase solution resulting from step (b) is subjected to a ripening in step (c). In contrast to the prior art (WO2008/148384A1, p. 9, l. 31), the single-phase solution is preferably stirred during this ripening process. A thorough mixing of the system by stirring results in the ripening being slightly faster. Moreover, the thorough mixing of the single-phase solution leads to an elimination of temperature gradients, which in turn brings about better temperature control and therefore a more simple scaleability of the process. Preference is given to using a stirrer which does not cause bubbles in the single-phase solution. In this connection, those which are based on the principle of a coil have proven to be particularly suitable. The speed of the stirrer is also chosen such that no bubbles can form in the single-phase solution. Speeds of 4 to 50 rpm, particularly of less than 25 rpm, very particularly those which are less than 10 rpm, have proven to be useful.

As a result of thoroughly mixing the single-phase solution during the ripening, it is now possible to homogeneously incorporate pharmaceutical ingredients into the sol. In particular, the incorporation of temperature-sensitive active ingredients is suitable for this purpose since the step of reactive evaporation (associated with the higher reaction temperatures which are required for the evaporation) has already been concluded.

Within the context of the invention, "active ingredients" are defined as substances which bring about a specific effect, a reaction, in a small dose in an organism. The active ingredient used is preferably a medicament, particularly preferably a temperature-sensitive medicament, i.e. an active ingredient which is used for therapeutic purposes on the human or animal body. Temperature-sensitive active ingredients and/or medicaments are those whose degradation is considerably faster at temperatures below 8° C., preferably below 2° C.

An important influential parameter during the ripening (step (c)) is the temperature. In principle, the ripening can be carried out at temperatures of down to −80° C. to 78° C. and while regulating the pressure also above this. At all temperatures, a sol known according to the prior art can be produced. However, it has proven to be particularly favourable if the ripening is carried out at temperatures of from 25° C. to 35° C. Firstly, the preparation time at these temperatures is considerably shorter (from 2-3 weeks when carrying out the ripening at 4° C. compared to 2 days when carrying out the reaction at 31° C.). Secondly, the ripening should ideally not exceed a temperature of 45° C. since otherwise the termination of the ripening cannot be ensured for the target values specified below for viscosity and loss factor, the reaction still proceeds further and a material is obtained which is undesired, i.e. is no longer biodegradable and/or exceeds the gel point and can no longer be spun.

According to the invention, the silica sol material obtained in step (c) preferably has a viscosity between 30 and 100 Pa·s (shear rate 10 s$^{-1}$ at 4° C.), preferably from 35 to 70 Pa·s (shear rate 10 s$^{-1}$ at 4° C.) with a loss factor (at 4° C., shear rate 10 s$^{-1}$, 1% deformation) of from 2 to 5, preferably from 2.5 to 3.5 and particularly preferably from 2.8 to 3.2. These conditions for the ripening are especially preferred if the silica sol material is to be subsequently spun to give a fibre. For powders and monoliths, viscosities above 60 Pa·s at a shear rate of 10 s$^{-1}$ at 4° C. are preferred.

The silica sol material produced by the process according to the invention can be further processed to give a fibre, a nonwoven, a powder, monolith and/or a coating. The further processing is known to the person skilled in the art.

Spinning processes for such silica sol materials to give fibres and/or nonwovens have been described for example in DE 196 09 551C1 and DE 10 2004 063 599 A1. The production of powders, monolith and/or a coating starting from the silica sol material according to the invention has been described for example in WO2008/086970A1, WO2008/148384A1 and WO2009/077104.

Preferably, all production steps (a) to (c) are carried out in one and the same reaction vessel. Preferably, all production steps (a) to (c) are carried out with moderate stirring. The reaction vessel preferably comprises a stirred reactor which has the following features: 1) it can be closed and is pressure-resistant down to at least 10 bar and can be heated at least between −20° C. and 80° C. The pressure and the temperature are ascertained, indicated and can be regulated. 2) It has an access for the metered addition of the respective liquid components, a bottom outlet valve for removing the product and a gas entry for applying pressure and/or in order to remove some of the gaseous alcohol and the aqueous acid by distillation from the reaction mixture.

It is conceivable to equip the reaction vessel with probes for measuring the viscosity of the reaction mixture. Other probes, such as IR or Raman probe can be used to monitor the concentrations of reaction components.

Surprisingly, it has been found that the individual reaction steps (a) to (c) obey a simple Arrhenius equation. The preexponential factor and the activation energy can be determined empirically by the methods known to the person skilled in the art. Consequently, it is possible either to predict the time when the reaction will be complete for a pregiven reaction temperature, or to determine the required reaction temperature for a pregiven reaction time.

In contrast to the predictive methods described in the prior art, which only permit a very imprecise prediction (prediction within a range of ±2 days), with the present process it is possible to be able to predict the end of the production of the specified silica sol material within a range of ±2 hours.

The process according to the invention overcomes the disadvantages of the prior art. By virtue of the controlled bringing together of the starting materials, the production process can be better controlled overall. The reproducibility is increased and the production process is scaleable. Further improvements arise as a result of the additional measure of the stirring of the single-phase solution during the ripening step (c) preferably at a temperature of 25° C. to 35° C. Carrying out the ripening at the described preferred temperatures also in particular brings about a considerable increase in the rate of the overall production process without having to accept drawbacks with regard to the required product properties of the silica sol material. By virtue of the influential parameters described according to the invention, it has been possible to reduce the synthesis time overall by approximately 90%. A prognosis method now also makes it possible, inter alia on the basis of the improved production process, to be able to predict the end of the silica sol material production process at the start of the production within a range of ±2 hours.

The invention is illustrated below by reference to examples, without, however, limiting it thereto.

EXAMPLES

FIG. 1 shows the diagrammatic arrangement of a synthesis reactor and its direct periphery to the production of spinnable and biodegradable silica sol material.

1st Working Example

As starting materials for the hydrolysis condensation, 5.4 mol of TEOS (tetraethoxysiloxane) in ethanol 6.8 mol were introduced into a closed reaction vessel. 9.6 mol of water in the form of a 0.006 N $HNO_3$ solution were mixed beforehand and then metered into the ethanol/TEOS mixture in a controlled manner over a period of 1 hour at a constant temperature (isotherm mode) of 37° C. The reaction solution is after-stirred for 17 hours until an ethanol concentration of about 68% by weight has been reached. The single-phase solution was then evaporated at a constant bottom temperature of 62° C. and a pressure between 500 and 120 mbar successively to a viscosity of 1 Pa·s at a shear rate of 10 $s^{-1}$ at 4° C. The ripening of the silica sol material was carried out with stirring at a temperature of 28.1° C. up to a viscosity of 55 Pa·s at a shear rate of 10 $s^{-1}$ at 4° C. and a loss factor of 3.

2nd Working Example

Ethanol (2.6 mol; 100%) was introduced into a closed reaction vessel. The remaining ethanol (4.2 mol; 100%) was metered in, in a controlled manner, together with 5.4 mol of TEOS via an access to the ethanol in the reaction vessel over a period of one hour. Simultaneously, via another access to the reaction vessel, 9.6 mol of water in the form of a 0.006 N $HNO_3$ solution were metered in over a period of one hour. The reaction was carried out such that the bottom temperature in the reaction vessel is 37° C. throughout the entire reaction (isotherm mode). The other process steps were carried out as described in the first working example, with the exception of the ripening temperature. The ripening temperature was 4° C.

3rd Working Example

Ethanol (6.8 mol; 100%) was introduced into a closed reaction vessel together with 9.6 mol of water in the form of a 0.006 N $HNO_3$ solution. 5.4 mol of TEOS (tetraethoxysiloxane) were metered into the mixture located in the reaction vessel in a controlled manner over a period of one hour. The reaction was carried out such that the bottom temperature in the reaction vessel was 37° C. throughout the entire reaction (isotherm mode). The other process steps were carried out as described in the first working example. The ripening of the silica sol material was carried out with stirring at a temperature of 7° C. up to a viscosity of 30 Pa·s at a shear rate of 10 $s^{-1}$ at 4° C. and a loss factor of 3.1.

The invention claimed is:
1. A method for producing a silica sol material by
  (a) controlled bringing together of an aqueous acid solution and a hydrolysable silicon compound,
  (b) subsequent evaporation to give a single-phase solution with a viscosity in a range from 0.5 to 30 Pa·s at a shear rate of 10 $s^{-1}$ at 4° C., and
  (c) ripening of the single-phase solution obtained in (b) to give a silica sol material with a viscosity from 30 to 100 Pa·s at a shear rate of 10 $s^{-1}$ at 4° C. and a loss factor of from 2 to 5;
wherein a) is carried out under isothermal conditions,
wherein the ripening in c) is carried out with stirring of the single-phase solution, and
wherein a) to c) is carried out in the same reaction vessel.

2. A method according to claim 1, wherein the controlled metered addition in a) takes place over a period of at least 15 minutes.

3. A method according to claim 1, wherein b) is carried out in a closed apparatus and wherein a temperature in b) is kept constant by regulating pressure of said closed apparatus.

4. A method according to claim 1, wherein the ripening in c) is carried out at a temperature of from 25° C. to 78° C. under a standard pressure of 1 atm or at a temperature >78° C. at superatmospheric pressure.

5. A method according to claim 1, wherein the ripening in c) is carried out at a temperature from 25° C. to 35° C.

6. A method according to claim 1, wherein the hydrolysable silicon compound comprises an Si compound of formula $SiX_4$,
  in which the radicals X are identical or different and are hydroxyl, hydrogen, halogen, amino, alkoxy, acyloxy, alkylcarbonyl and/or alkoxycarbonyl and are derived from alkyl radicals which are optionally substituted straight-chain, branched or cyclic radicals having 1 to 20 carbon atoms, optionally having 1 to 10 carbon atoms, and can be interrupted by oxygen or sulphur atoms or by amino groups.

7. A method according to claim 1, wherein the hydrolysable silicon compound comprises tetraethoxysilane.

* * * * *